(12) United States Patent
Katz et al.

(10) Patent No.: US 12,057,111 B2
(45) Date of Patent: Aug. 6, 2024

(54) SYSTEM AND METHOD FOR VOICE BIOMETRICS AUTHENTICATION

(71) Applicant: Nice Ltd., Ra'anana (IL)

(72) Inventors: Natan Katz, Tel Aviv (IL); Ori Akstein, Petach Tikva (IL); Tal Haguel, Petach Tikva (IL)

(73) Assignee: Nice Ltd., Ra'anana (IL)

( * ) Notice: Subject to any disclaimer, the term of this patent is extended or adjusted under 35 U.S.C. 154(b) by 53 days.

(21) Appl. No.: 17/325,886

(22) Filed: May 20, 2021

(65) Prior Publication Data

US 2022/0375461 A1 Nov. 24, 2022

(51) Int. Cl.
*G10L 15/16* (2006.01)
*G06N 3/084* (2023.01)
*G10L 15/06* (2013.01)

(52) U.S. Cl.
CPC .............. *G10L 15/16* (2013.01); *G06N 3/084* (2013.01); *G10L 15/063* (2013.01); *G10L 2015/0635* (2013.01)

(58) Field of Classification Search
CPC .................. G10L 15/16; G10L 15/063; G10L 2015/0635; G10L 17/04; G10L 17/06; G10L 17/18; G06N 3/084; H04M 3/5183; H04M 2203/6045; H04M 2203/6054
See application file for complete search history.

(56) References Cited

U.S. PATENT DOCUMENTS

| | | | |
|---|---|---|---|
| 6,247,003 B1 * | 6/2001 | Cummins | H02H 1/046 700/48 |
| 6,384,995 B1 * | 5/2002 | Smith | G11B 27/36 360/25 |
| 8,056,128 B1 | 11/2011 | Dingle et al. | |
| 8,145,562 B2 | 3/2012 | Wasserblat et al. | |
| 8,225,413 B1 | 7/2012 | De et al. | |
| 9,042,867 B2 | 5/2015 | Gomar | |
| 9,620,123 B2 | 4/2017 | Faians et al. | |
| 9,917,833 B2 | 3/2018 | Gomar | |
| 10,110,738 B1 | 10/2018 | Sawant et al. | |
| 10,678,899 B2 | 6/2020 | Keret et al. | |
| 10,854,204 B2 | 12/2020 | Faians et al. | |
| 10,911,600 B1 | 2/2021 | Frenkel et al. | |
| 2003/0160944 A1 * | 8/2003 | Foote | G11B 27/034 |
| 2004/0249650 A1 | 10/2004 | Freedman et al. | |

(Continued)

OTHER PUBLICATIONS

Zhipeng, Dong, et al. "Voiceprint recognition based on BP Neural Network and CNN." Journal of Physics: Conference Series. vol. 1237. No. 3. IOP Publishing, 2019, pp. 1-7. (Year: 2019).*

(Continued)

*Primary Examiner* — Jesse S Pullias
*Assistant Examiner* — Michael C. Lee
(74) *Attorney, Agent, or Firm* — PEARL COHEN ZEDEK LATZER BARATZ LLP

(57) ABSTRACT

A system and method for authenticating an identity may include generating a first generic representation representing a stored audio content, generating a second generic representation representing input audio content, and, providing the first and second generic representations to a voice biometrics unit adapted to authenticate an identity based on the first and second generic representations.

14 Claims, 7 Drawing Sheets

(56) References Cited

U.S. PATENT DOCUMENTS

| | | | |
|---|---|---|---|
| 2007/0071206 A1* | 3/2007 | Gainsboro | H04M 3/42221 379/168 |
| 2011/0206198 A1 | 8/2011 | Freedman et al. | |
| 2013/0216029 A1 | 8/2013 | Pawlewski | |
| 2015/0055763 A1 | 2/2015 | Guerra et al. | |
| 2015/0142446 A1 | 5/2015 | Gopinnathan et al. | |
| 2015/0269941 A1 | 9/2015 | Jones | |
| 2015/0281446 A1 | 10/2015 | Milstein et al. | |
| 2018/0032755 A1 | 2/2018 | Odinak | |
| 2018/0082689 A1 | 3/2018 | Khoury et al. | |
| 2018/0082692 A1* | 3/2018 | Khoury | G10L 19/028 |
| 2018/0152446 A1 | 5/2018 | Gomar | |
| 2018/0358003 A1* | 12/2018 | Calle | G10L 15/063 |
| 2019/0037081 A1 | 1/2019 | Rao et al. | |
| 2019/0373105 A1 | 12/2019 | Kung et al. | |
| 2020/0184979 A1 | 6/2020 | Keret et al. | |
| 2020/0213337 A1* | 7/2020 | Hodgman | H04L 67/306 |
| 2020/0250290 A1 | 8/2020 | Keret et al. | |
| 2021/0037136 A1 | 2/2021 | Michaeli et al. | |
| 2021/0112163 A1 | 4/2021 | Frenkel et al. | |
| 2021/0182660 A1* | 6/2021 | Amirguliyev | G06N 3/084 |
| 2021/0182661 A1* | 6/2021 | Li | H04L 41/16 |
| 2021/0272573 A1* | 9/2021 | Yousefi | G06N 3/044 |
| 2021/0280171 A1* | 9/2021 | Phatak | G06N 3/045 |
| 2021/0319801 A1* | 10/2021 | Kim | G10L 21/02 |
| 2021/0357433 A1* | 11/2021 | Ganguly | G06N 3/045 |
| 2022/0172739 A1* | 6/2022 | Shor | G10L 15/02 |
| 2022/0246130 A1* | 8/2022 | Baughman | G10L 13/02 |
| 2022/0270611 A1* | 8/2022 | Tuo | G10L 17/18 |

OTHER PUBLICATIONS

Ye, Feng, et al. "A deep neural network model for speaker identification." Applied Sciences 11.8 (Apr. 16, 2021), pp. 1-18 (Year: 2021).*

Hicsonmez, Samet, et al. "Methods for identifying traces of compression in audio." 2013 1st International Conference on Communications, Signal Processing, and their Applications (ICCSPA). IEEE, 2013, pp. 1-6. (Year: 2013).*

Glembek, Ondrej, Lukáš Burget, and Pavel Matejka. "Voice Biometry Standard, Draft." *Brno: Speech@ FIT* (2015).

* cited by examiner

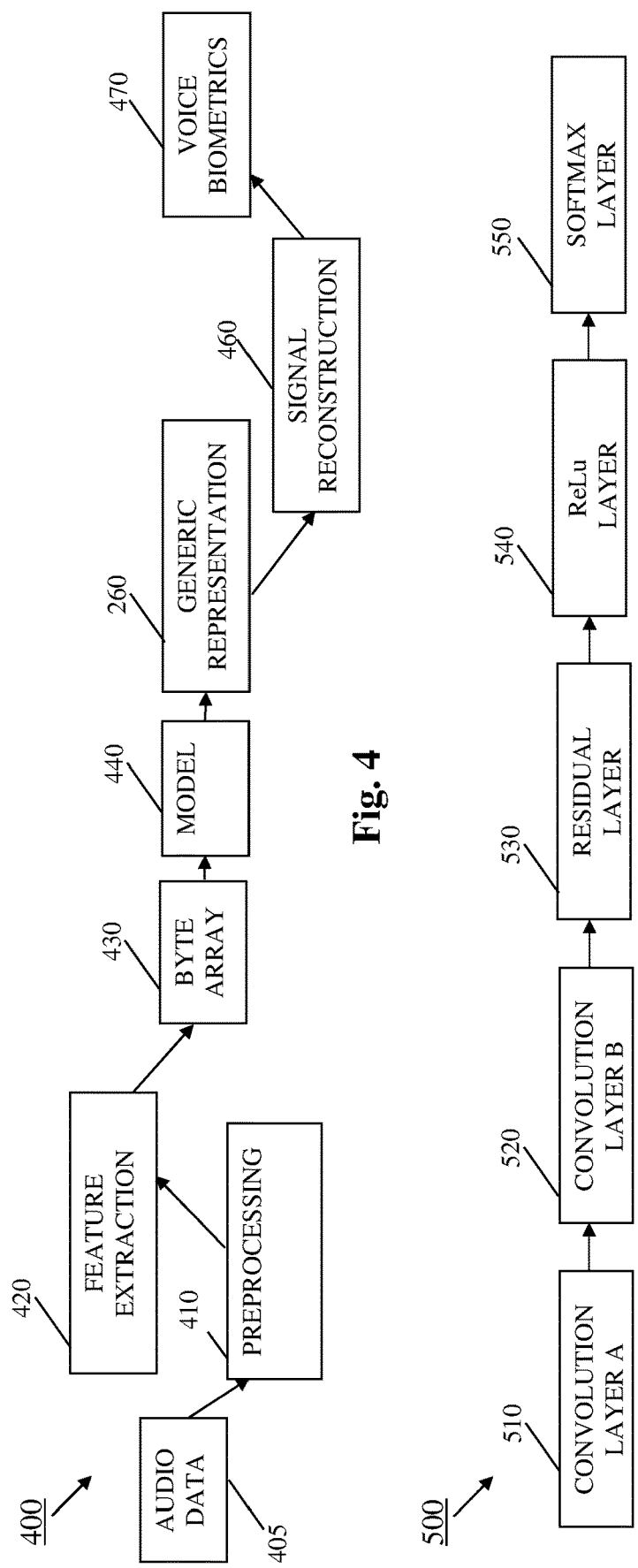

SYSTEM AND METHOD FOR VOICE BIOMETRICS AUTHENTICATION

FIELD OF THE INVENTION

The present invention relates generally to generating a generic representation of audio content. More specifically, the present invention relates to using a generic representation of audio content for authentication.

BACKGROUND OF THE INVENTION

Voice biometrics (VB) is a technology that verifies an identity (e.g., of a caller) based on recognition of voice patterns which are particular to each individual. For example, in order to verify that a caller is indeed who s/he says s/he is, a VB engine in a call center may match a stored voice print of a caller with the callers' voice or audio content as captured during a call.

However, current systems and methods suffer from a number of drawbacks. For example, information used by current systems and methods to authenticate callers (e.g., voice prints as known in the art) is produced based on compressed (not original) audio content, since loss of information is caused by the compression, the accuracy with which a VB engine can verify the identity of a caller is reduced. As known in the art and referred to herein, a codec is a unit or device that encodes a stream of data. Typically, a codec compresses information in a stream of data to produce compressed data representing the stream of data.

Moreover, since systems may store voice prints that may be produced using (or based on output from) different codecs, a VB engine may be provided with a voice print produced by a first codec and content as captured during a call which is produced by a second, different codec. Since VB engines are very sensitive to the type and attributes of the audio codecs involved in producing their input, this mix of codecs further reduces accuracy.

SUMMARY OF THE INVENTION

In some embodiments, a system and method of enrollment and of authenticating an identity may include: creating a model by training a neural network to generate generic representations of audio content; including the model in a generic representation generation (GRG) unit, and generating, by the GRG unit, a first generic representation representing a stored audio content. A system and method may include receiving input audio content; and generating, by the GRG unit, a second generic representation representing the input audio content, wherein the first and second generic representations are usable, by a VB unit, to authenticate an identity associated with the input audio content. A system and method may include providing the first and second generic representations to a VB unit. The GRGTML unit may generate a third generic representation of a second stored audio content; and provide the second and third generic representations to a VB unit.

A generic representation may be generated based on at least one of: a bitrate of the stored audio content and a sample rate of the stored audio content. A generic representation may include a byte array of features extracted from audio content, wherein the size of the array is set based on at least one of: a bitrate of the audio content and a sample rate of the audio content.

A generic representation may be associated with a score value and a system and method may select whether or not to provide the generic representation to a VB unit based on the score. If a score value is not within a predefined range then a system and method may use at least one of: an input audio content and a generic representation to retrain the GRG unit. A score may be calculated using a loss function.

After retraining the GRG unit, a system and method may generate a new generic representation for a stored audio content, and a system and method may replace a previous generic representation by the newly created generic representation. A system and method may reconstruct audio content based on a generic representation and may provide the reconstructed audio content to a VB unit. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with the same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not of limitation in the figures of the accompanying drawings, in which like reference numerals indicate corresponding, analogous or similar elements, and in which:

FIG. 4 shows a system and flows according to illustrative embodiments of the present invention; and FIG. 5 shows a system and flows according to illustrative embodiments of the present invention.

DETAILED DESCRIPTION OF THE INVENTION

Some embodiments may create a model by training a neural network (or other machine learning unit) to generate and store a first generic representations of audio content. Some embodiments may receive input audio content, generate a second generic representation representing the input audio content, and provide the first and second generic representations to a VB engine. The VB engine may indicate whether or not the first and second generic representations are related to or spoken by the same person.

Figure 1:
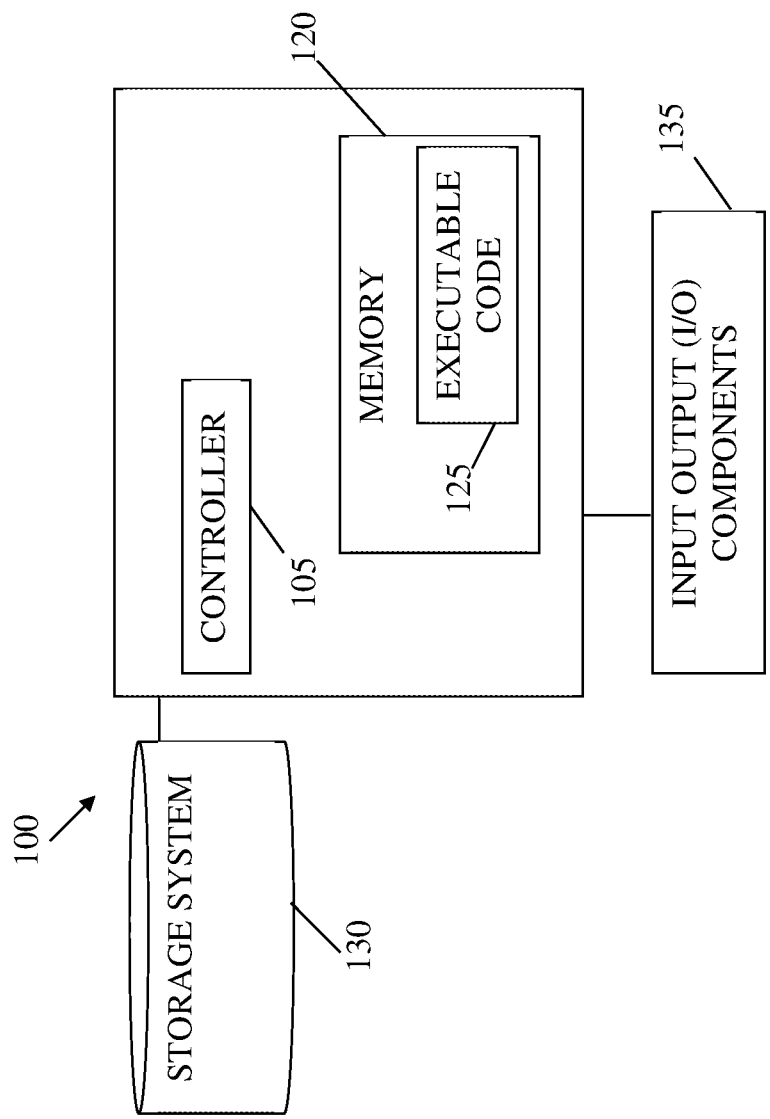
FIG. 1 shows a block diagram of a computing device according to illustrative embodiments of the present invention.

Reference is made to FIG. 1, showing a non-limiting, block diagram of a computing device or system 100 that may be used to verify entities or validate identities of callers according to some embodiments of the present invention. Computing device 100 may include a controller 105 that may be a hardware controller. For example, computer hardware processor or hardware controller 105 may be, or may include, a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory, a cache memory, a buffer, a short term memory unit, a long term memory unit, or any other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

As referred to herein, "a controller" or "a processor" carrying out a function or set of functions can include one or more such controllers or processors, possibly in different computers, doing so. Accordingly, it will be understood that any function or operation described as performed by a controller 105 may be carried by a set of two or more controllers in possibly respectively two or more computing devices. For example, In an embodiment, when the instructions stored in one or more memories 120 are executed by one or more controllers 105 they cause the one or more controllers 105 to carry out methods of generating and matching generic representations as described herein. For example, controller 105 may execute code to act as a GRG unit, NN, or other unit or module as discussed herein.

Figure 2:
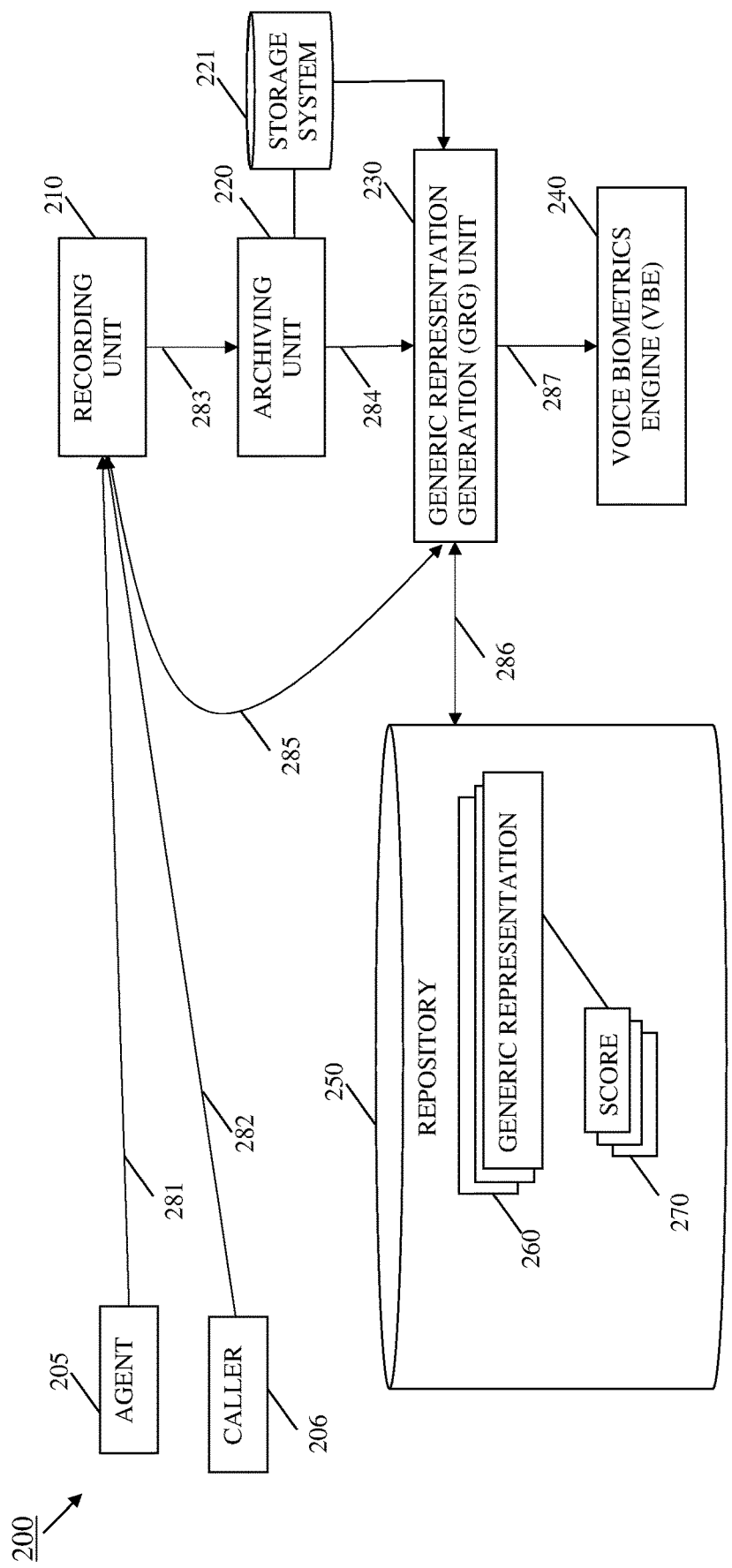
FIG. 2 shows an overview of a system and flows according to illustrative embodiments of the present invention.

More than one computing device 100 may be included, and one or more computing devices 100 may act as the various components, for example the components of system 200 such as generic representation unit 230 and archiving unit 220 shown in FIG. 2 (and further described herein) may each include a controller 105, a memory 120 and executable code 125.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that generates generic representations, e.g., as shown by generic representations 260 as shown in FIG. 2 and as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Computing device or system 100 may include an operating system (OS) that may be code (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system. Accordingly, units included in computing device or system 100 may cooperate, work together, share information and/or otherwise communicate.

Storage system 130 may be or may include, for example, a database, a hard disk drive, a disk array, a recordable media, a universal serial bus (USB) device or any other suitable, long-term storage system that may be removable and/or fixed storage unit.

I/O components 135 may be, may include, or may be used for connecting (e.g., via included ports): a mouse; a keyboard; a touch screen or pad or any suitable input device. I/O components may include one or more screens, touchscreens, displays or monitors, speakers and/or any other suitable output devices. Any applicable I/O components may be connected to computing device 100 as shown by I/O components 135, for example, a wired or wireless network interface card (NIC), a universal serial bus (USB) device or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a workstation, a server computer, a network device, or any other suitable computing device.

Reference is made to FIG. 2, an overview of a system 200 and flows according to some embodiments of the present invention. As shown, system 200 may include a recording unit 210, an archiving unit 220 connected to a storage system 221. Storage system 221 may include components of, and/or it may be similar to, storage system 130. As further shown, system 200 may include a generic representation generation (GRG) unit 230, a voice biometrics engine (VBE) 240 and a repository 250. As shown, repository 250 may include generic representations 260 and scores 270 (collectively referred to hereinafter as generic representations 260 and/or scores 270 or individually as a generic representation 260 and/or a score 270, merely for simplicity purposes). GRG unit 230 may include a controller 105, memory 120 and executable code 125, similarly, recording unit 210, archiving unit 220 and VBE 240 may include a controller 105, memory 120 and executable code 125. GRG unit 230 may include or be a model generated by training a neural network (NN), e.g., a Convolutional Neural Network (CNN) etc. Thus a model may be, or be included in a NN or CNN, which is a computer construct including layers of neurons or nodes, each neuron connected by links to neurons in other layers.

Generic representations 260 and a scores 270 may be any suitable digital data structure, construct or computer data objects that can be stored and/or modified in repository 250, and/or can be retrieved from repository 250. For example, representations 260 and/or a scores 270 may be files, or may be included in a database in repository 250. Generally, a first score 270 may be associated with a first generic representation 260 and a second, different score 270 may be associated with a second generic representation 260. For example, association of scores 270 with generic representations 260 may be done using a table in which each entry includes a reference to (or identification of) a generic representation 260 and a reference to (or identification of) an associated score. In some embodiments, a score 270 may be included in a generic representation 260, e.g., such that when a generic representation 260 is retrieved from repository 250 (e.g., by GRG unit 230) its score is also retrieved and available.

Content, e.g., generic representations 260 and scores 270 as further described herein, may be loaded from repository 250 into a memory 120 included in GRG unit 230 where it may be processed by controller 105 included in GRG unit 230. For example, a score 270 and a generic representation 260 may be loaded into a memory 120 of GRG unit 230 and used for authenticating or validating an entity as described herein.

Caller 206 may be a device (e.g., a telephone or smartphone) used by a customer, person or other entity calling a call center, and agent 205 may be a device used by an agent to speak with the calling entity. Data carried from caller 206 and agent 205 as shown by arrows 281 and 282 may represent speech of the caller and the agent and may be compressed or uncompressed audio codec payload, e.g., formatted according to μ-law (mu-law), a well known in the art version of the G.711 standard.

Recording unit may utilize a codec (e.g., a codec known in the art as G729, which synthesizes human voice signal for audio data compression) to compress data received as shown by arrows 281 and 282 and, recording unit 210 may pass or provide the compressed audio data to archiving unit 220 (as shown by arrow 283) which may archive the compressed data in storage system 221.

The compressed data produced by recording unit 210 may be passed or provided to GRG unit 230 as shown by arrow 284. It is noted that the compressed data may be provided to GRG unit 230 from (or via) archiving unit 220 or directly from recording unit 210 (the direct path from recording unit 210 to GRG unit 230 is not shown for simplicity). In yet other embodiments, GRG unit 230 may retrieve compressed data produced by recording unit 210 from storage system 221, e.g., instead of receiving compressed data from recording unit 210 or from archiving unit 220, GRG unit 230 may use access to storage system 221 to obtain the compressed data.

GRG unit 230 may, based on data produced by archiving unit 220, generate a generic representation 260 of the data and store the generic representation 260 in repository 250 as shown by double headed arrow 286. As shown by double headed arrow 286, GRG unit 230 can read and write data from/to repository 250. GRG unit 230 may calculate a score 270 for the generic representation 260, associate the score 270 with the generic representation 260 and may store the score 270 in association with the generic representation 260. For example, a score 270 may be included in a generic representation 260 such that when the generic representation 260 is retrieved, the score 270 is retrieved with it. In other embodiments, a list, table or pointers may be used to associate a score 270 with a generic representation 260 such that given a specific generic representation 260, the associated score 270 can be found in, and retrieved from, repository 250.

GRG unit 230 may generate generic representations 260 for (e.g., compressed) audio content in storage system 221. For example, during a phase referred to in the art as enrollment, GRG unit 230 may retrieve audio content objects (e.g., recordings of calls with customers stored therein by archiving unit 220) from storage system 221 and may generate generic representations 260 for the audio content objects as well as associate the generic representations 260 with scores 270 as described.

Generic representations 260 and scores 270 may be used to authenticate, identify or validate the identity of a caller. For example, when caller 206 calls a call center, the caller's audio signal may be provided to recording unit 210 as described and, in addition or in parallel, as shown by arrow 285, the audio content may be provided to GRG unit 230, while the call is in progress.

GRG unit 230 may retrieve from repository 250 a generic representation 206 and score 270 for the caller (e.g., using the caller's phone number as a key), may reconstruct an audio signal from the retrieved generic representation 206 and provide the reconstructed audio signal and the signal of the ongoing call (received as shown by arrow 285) to VBE 240 which may, by matching or comparing the two inputs, indicate whether or not the caller is authenticated.

GRG unit 230 may be configured to provide different types of inputs to VBE 240. For example, GRG unit 230 may provide VBE 240 with two generic representations 206, one retrieved from repository 250 and another one created in real-time, on-the-fly, while a call is in progress, e.g., based on a signal received as shown by arrow 285. For example, GRG unit 230 may generate a (first) generic representation 260 for (or of) the callers audio received as shown by arrow 285. GRG unit 230 may retrieve, from repository 250, a (second) generic representation 260 which is associated with caller 206 and GRG unit may send the first and second generic representations 260 to VBE 240 as shown by arrow 287. VBE 240 may match or compare the first and second generic representations 260 and may indicate whether or not the first and second generic representations 260 are of, or are related to, the same person or entity. Accordingly, GRG unit 230 can provide VBE 240 with different types of inputs and thus GRG unit 230 can support different types or configurations of VBEs.

Provided with two (a pair) of inputs, e.g., first and second generic representations 260, or first and second signals, VBE 240 may indicate that the caller (or caller's identity) is indeed authenticated or verified, or that the caller is not authenticated (e.g., someone is impersonating the caller). If it is determined that the caller is not authenticated then any action may be taken, e.g., an alert may be sent to agent 205 and/or to any entity in a call center, a log entry reporting a security breach or fraud may be created and so on.

Finding, in repository 250, a generic representation 260 for a specific caller may be done using any method. For example, each generic representation 260 in repository 250 may include, or be associated with, a telephone number (e.g., the number from which the relevant caller called) and thus, when a call arrives, a generic representation 260 may be retrieved based on the source (calling) phone number.

Embodiments of the invention improve the technological, computerized fields of security and authentication, identification and validation of entities, and more specifically, with respect to call centers, by removing the effect of codecs from the process. That is, by providing systems and methods of authentication, identification and validation of entities, which are unaffected by the type and number of codecs used to process, produce or change audio content, embodiments of the invention perform well regardless of any processing of audio content.

For example, since voice prints used by current systems and methods are created based on audio data produced by codecs (that is, compressed data), current systems and methods are required to decompress (uncompress) voice prints prior to providing them to a VBE, however, as known in the art, decompression of content comes with a price in the form of loss of data, thus the accuracy of current systems and methods is reduced. In contrast, using generic representations 260 as described, some embodiments of the invention do not need to decompress any information thus accuracy is increased with respect to current systems and methods.

Yet another improvement or advantage of some embodiments of the invention over current systems and methods is the ability to handle any mix of codecs used. Audio data arriving at a call center (or at any destination for that matter) is typically the product (or output) of more than one codec. For example, audio data received by recording unit 210 in a call center is typically a time-wise array of bytes produced by a first codec (e.g., in a switch), a recorder unit in a call center typically applies a second codec (e.g., G.729 that compresses the audio data) and so on.

Accordingly, referring to current systems and methods, if a first codec is applied to content used as a voice print and a second (different) codec is used for an incoming call then current systems and methods may (wrongly) determine a mismatch exists between the voice print and the incoming call since representations of content produced by different codecs are different and since compression loss rates of different codecs are different. In contrast, using generic representations 260 as described, some embodiments of the invention are completely indifferent to, or unaffected by, the number and type of codecs used, or applied to the audio content, and thus such processing may be improved.

Yet another improvement or advantage of some embodiments of the invention over current systems and methods is the ability to replace a set of data elements having different types by a set of data elements of the same type. For example, current systems and methods typically store a plurality of voice prints (data elements) which are generated based on data produced by a plurality of different codecs, by replacing such plurality of (different types of) voice prints by a set of generic representations 260, embodiment of the invention enable maintaining data elements which are all of the same type, thus, for example, eliminating the problems (inaccuracies) caused by the sensitivity of voice biometrics units to the type of codecs involved.

Figure 3A:
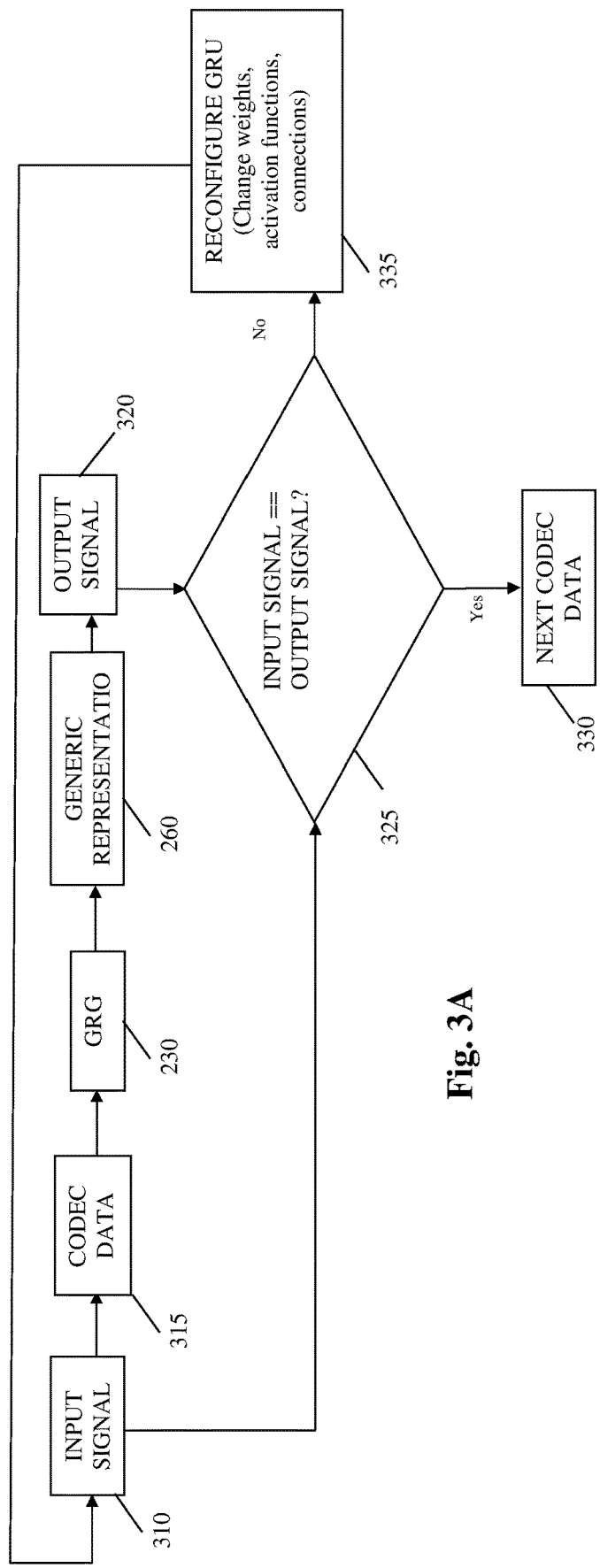
FIG. 3A shows a flowchart of a method of training a network according to illustrative embodiments of the present invention.

Reference is made to FIG. 3A which shows a flowchart of a method of training a network (e.g., generating a model in GRG unit 230) according to illustrative embodiments of the present invention. As shown, an input signal 310 may be used to generate codec data 315. For example, input signal 310 may be data sent from caller 206 and codec data 315 may be generated by recording unit 210 (e.g., using a G.729 codec). Codec data 315 may be formatted data, e.g., after application of a G.729 codec (a codec that compresses data according to the G.729 standard) by recording unit 210, archiving unit 220 may encapsulate the data, e.g., in a file, and store the file in storage system 221. Accordingly, codec data 315 may be data as stored in storage system 221 by archiving unit 220.

As shown, GRG unit 230 may be provided with codec data 315 and may produce a generic representation 260 representing the codec data 315. Next, GRG unit 230 may produce output signal 320 based on generic representation 260. As shown by block 325, an embodiment may check whether input signal 310 and output signal 320 are the same or are relatively the same. Checking the performance of GRG unit 230 as shown by block 325 may include determining a distance, e.g., a Euclidian distance, between input signal 310 and output signal 320.

As shown by block 330, if input signal 310 and output signal 320 are the same or are relatively the same, training of GRG unit 230 may continue, e.g., by obtaining a new input signal 310 and repeating the process described herein. As shown by block 335, if input signal 310 and output signal 320 are not the same or are not even relatively the same, GRG unit 230 may be configured (or reconfigured). For example, GRG unit 230 may be, or may include a neural network model and reconfiguration of GRG unit 230 may include modifying weights of neuron connections, modifying activation functions and the like, e.g. using backpropagation.

The method or process illustrated in FIG. 3A may be repeated until GRG unit 230 is capable of receiving codec data 315, generating a generic representation 260 of the codec data 315 and produce (or reconstruct) output signal 320 which is similar or even same as the original input signal 310. Generally, once GRG unit 230 is trained for a specific codec, it can accurately produce (or reproduce or reconstruct), based on a generic representation 260, the original signal data for any data produced by the specific codec. For example, after GRG unit 230 is trained to reproduce an original input signal 310 for a G.729 codec, then, provided with codec data produced using a G.729 codec which GRG unit 230 has never seen or processed before, GRG unit 230 can reproduce the original signal data, that is, the signal data to which the G.729 codec was applied. It will be understood that GRG unit 230 may be trained for any type or number of codecs.

Figure 3B:
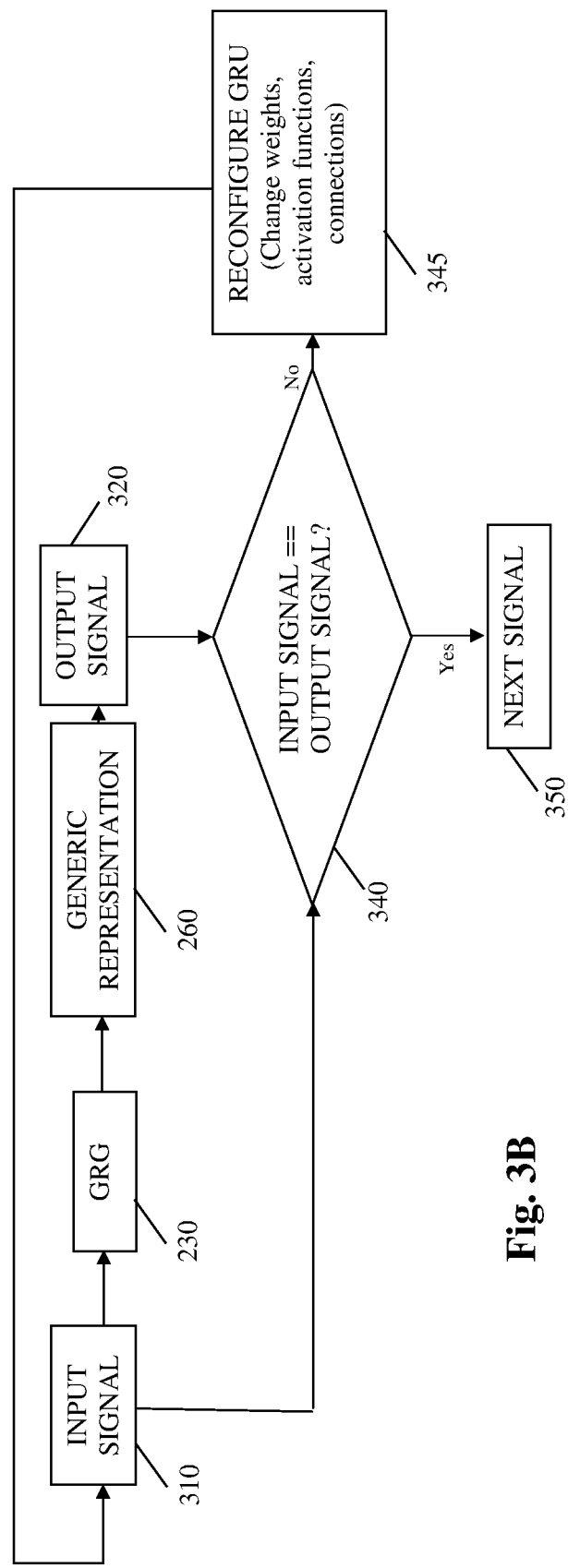
FIG. 3B shows a flowchart of a method of training a network according to illustrative embodiments of the present invention.

Reference is made to FIG. 3B which shows a flowchart of a method of training a network (e.g., generating a model in GRG unit 230) according to illustrative embodiments of the present invention. As shown, GRG unit 230 may be trained to receive input signal 310, generate a generic representation 260 representing the input signal 310 and reconstruct the input signal data in the form of output signal 320. As shown by block 340, in training, similarity of output signal 320 with input signal 310 may be checked and, as shown by block 350, if the two signals are same or similar then training may terminate or training may be continued using additional input signals 310. Checking the performance of GRG unit 230 as shown by block 340 may include determining a distance, e.g., a Euclidian distance, between input signal 310 and output signal 320.

As shown by block 345, if the two signals (310 and 320) are not the same or similar then configuration of GRG unit 230 may be modified, e.g., neuron connection weights or activation functions may be changed and additional training loops may be carried out.

Generally, once GRG unit 230 is trained to reconstruct an input signal of a specific type (e.g., from a specific source type, of a specific format etc.) then GRG unit 230 may accurately reconstruct any signal coming from the specific type, source type, or format.

Figure 3C:
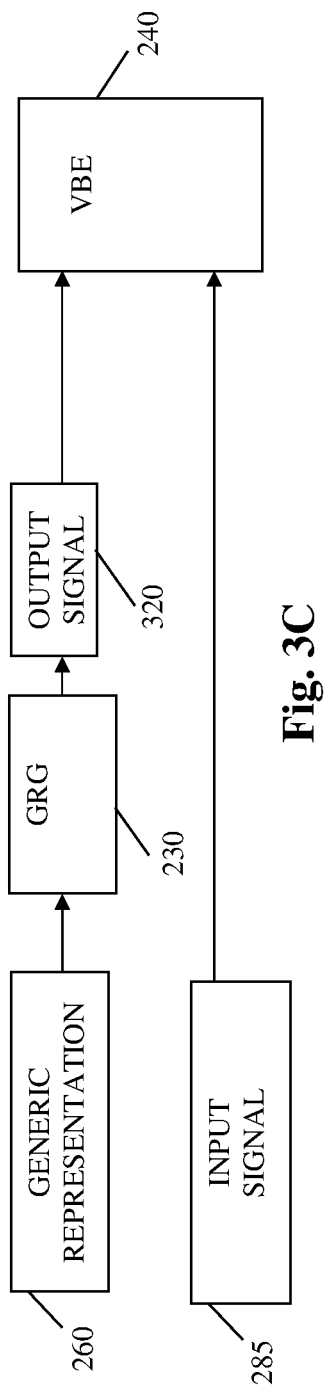
FIG. 3C shows a flowchart of a method of producing input to a voice biometric engine according to illustrative embodiments of the present invention.

Reference is made to FIG. 3C which shows a flowchart of a method of producing input to a VBE according to illustrative embodiments of the present invention. As shown, GRG unit 230 may receive or obtain, as input, a generic representation 260. For example, based on a phone number of caller 206, GRG unit 230 may retrieve, from repository 250, a generic representation associated with caller 206. As further shown, GRG unit 230 may use the generic representation 260 to produce output signal 320 and may send or provide the output signal 320 to VBE 240. As further shown, signal data 285 (signal data received from caller 206) may also be provided to VBE 240 which may, based on the two signals' data, determine whether or not caller 206 is authenticated, e.g., based on determining whether or not output signal 320 and signal data 285 are related to the same person.

Figure 3D:
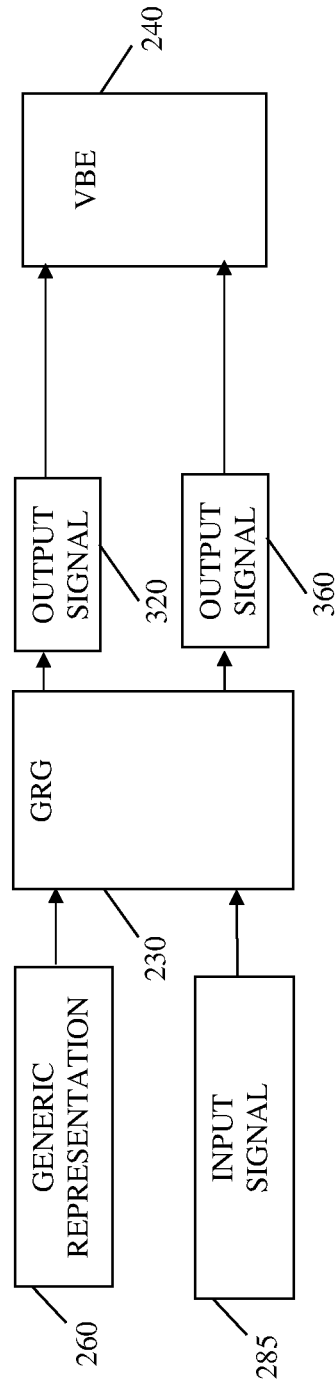
FIG. 3D shows a flowchart of a method of producing input to a voice biometric engine according to illustrative embodiments of the present invention.

Reference is made to FIG. 3D which shows a flowchart of a method of producing input to a VBE according to illustrative embodiments of the present invention. As shown, other than producing an output signal 320 based on a generic representation 260, GRG unit 230 may generate an output signal 360 based on an input signal 285. For example, GRG unit 230 may use input signal 285 to generate a generic representation 260 and then generate (or reconstruct) output signal 360 based on the representation 260. Accordingly, VBE 240 may be provided with two inputs that are produced by GRG unit 230, that is, the two inputs are created based on respective two generic representations 260, thus embodiments of the invention may provide full control of the type, format and other aspects of inputs provided to a VBE 240.

Reference is made to FIG. 4, an overview of a system 400 and flows according to some embodiments of the present invention. As shown, system 400 may receive, as input, audio data 405 and the system 400 may include a preprocessing unit 410, a feature extraction unit 420 which produces byte array 430, a model 440 which receives byte array 430 as input, and produces a generic representation 260 as output. As shown, system 400 may include a signal reconstruction unit 460 which reconstructs a signal based on generic representation 260. System 400 may include a VBE 470 which receives the reconstructed signal as input. For example, as described herein, a generic representation 260 may be created based on applying fast Fourier transform (FFT) to audio data, accordingly, reconstruction may include applying inverse fast Fourier transform (IFFT) to the generic representation. In some embodiments, GRG unit 230 includes a model 440.

Generally, bitrate as known in the art (and referred to herein) describes or indicates the amount of data used for representing audio data. For example, a bitrate of 16 kbits/sec means each second of audio is represented by 16,384 bits. Sample rate known in the art (and referred to herein) indicates the number of time audio data is sampled per unit time, e.g., 8000 Hz means that to generate a digital representation of audio, the audio is sampled 8,000 times each second.

Preprocessing unit 410 may examine input audio data 405, determine the sample rate and the bitrate of input audio data 405, and preprocessing unit 410 may calculate a layerinfo value according to example formula A below (as with the other formulas used herein, other or different formulas may be used):

$$\text{layerinfo value} = 2^{(bitrate)}/(\text{sample rate}) \qquad \text{Formula A}$$

Where bitrate is the bitrate of audio data 405 and sample rate is the sample rate of audio data 405. For example, remaining with the above examples of bitrate and sampled rate, a layerinfo value calculated by some embodiments may be 256 (calculated by $2^{16}/2^8=256$), accordingly, remaining with the above layerinfo value of 256, byte array 430 and generic representation 260 may be arrays of 256 bytes.

The output of preprocessing unit 410, which, along with input audio data 405, may be provided to feature extraction unit 420, may be the layerinfo value. It will be noted that feature extraction unit 420 may receive audio data 405 either via preprocessing unit 410 or otherwise.

Feature extraction unit 420 may extract and/or characterize features of input audio data 405, e.g., by applying FFT to input audio data 405. The output of feature extraction unit 420 may be an array of bytes 430, e.g., an array of bytes including numeric representations of amplitudes and frequencies produced by the application of FFT. Accordingly, features extracted (and placed in byte array 430) as described may be an amplitude and frequency. Other features may be used.

Generally, model 440 may receive, as input, byte array 430 and model 440 may generate a generic representation 260 (e.g., in the form of a byte array) based on the input. For example, a generic representation 260 may be produced by model 440 based on the result of applying FFT on input audio data 405.

Reference is made to FIG. 5, an overview of a system 500 and flows according to some embodiments of the present invention. Generally, model 440 and/or GRG unit 230 may be, or they may include components included in, system 500.

Convolutional layer A 510 may be the first layer in model 440, may identify, map or mark bytes in byte array 430 which contain data so that the next layer (convolution layer B 520) is provided with relevant input and needs not deal with bytes that include no data.

Convolutional layer B 520 may perform any mapping, convolution or transformation on its input. For example, output of convolutional layer A 510 may be the input of convolutional layer B 520. An NN or CNN as described herein may include any number of layers, which, as a whole, may be trained to produce the correct output based on an input.

Residual layer 530 may apply to its input several mathematical functions. For example, residual layer 530 may compute tanh(x) according to example formula B below:

$$\tanh(x) = \sinh(x)\cosh(x) = e^{2x} - 1 e^{2x} + 1 \qquad \text{Formula B}$$

Where x is an input value provided to residual layer 530.

Residual layer 530 may compute Sigma value according to formula C below:

$$\text{Sigma value} = \text{The sum of positive divisors function } \sigma x(n), \qquad \text{Formula C}$$

As shown, output from residual layer 530 may be provided to Rectified Linear Unit (ReLU) 540 layer. Various operations may be applied to data produced by Residual layer 530 before providing data or input to ReLU layer 530. For example, a XOR operation may be applied to the product of multiplying tanh(x) by the Sigma value, the result, combined with output from convolutional layer A 510, may be provided to ReLu layer 540 which may be an activation function as known in the art.

Output from ReLu layer 540 may be provided to softmax layer 550 which may compute σ(Z), according to example formula D below:

$$\sigma(\vec{z})_i = \frac{e^{z_i}}{\sum_{j=1}^{K} e^{z_j}} \quad \text{Formula D}$$

Where z is the value of the byte in index (location) "i" in an input array and K is the array's size (e.g., a layerinfo value calculated as described) and "j" is a running index through the array of bytes.

Some embodiments may generate a system for enrollment. Generally, enrollment may include producing generic representations 260 for stored audio content. For example, current systems and methods keep voice prints which are used for authenticating callers. Generally, a voice print includes audio of a specific person and is retrieved based on a phone number, when a call comes in, using the number from which the call was made, the voice print is retrieved and used for determining whether or not the caller is indeed the person associated with the phone number. An enrollment as referred to herein may include the process of generating generic representations of voice recordings of specific people (e.g., customers or other callers) for those people. Each person may be associated with a generic representation specific to them. For example, recorded audio (e.g., audio content 405) of callers may be used to generate generic representations 260. Generic representations 260 may be stored (e.g., in repository 250) and may be used to authenticate callers as further described.

A method of enrollment may include creating a model by training a neural network to generate generic representations of audio content and including the model in a generic representation generation (GRG) unit. For example, training an NN or CNN may be done as described with reference to FIG. 3A and FIG. 3B.

A generic representation may be, or may include, an array of bytes (e.g., 256 bytes). In some embodiments, an NN may be trained to receive audio content that may represent audio over time (e.g., 8,000 values for each second in the case of 8,000 Hz) and the NN may be trained to generate an array of bytes that represents or encodes attributes of the audio content. The NN may further be trained to reproduce (regenerate or reconstruct) the original, input audio content based on a generic representation. Accordingly, once an NN is trained (and thus a model is created or defined), a system (e.g., GRG unit 230 which may include a model generated as described) can produce a generic representation of an audio signal and can further accurately reproduce (reconstruct) an original signal based on a generic representation. Accordingly, embodiments of the invention solve the problem that is caused by the sensitivity of VB engines to the codec or other processing involved in producing their input audio content, this is because in some embodiments, either generic representations or audio reconstructed based on generic representations are provided to a VB engine which consequently needs to support a single, uniform format and needs not deal with inputs of different types (e.g., coming from different codecs).

Some embodiments may authenticate an identity by receiving, during a call, input audio content (e.g., the voice of a caller currently talking to an agent) and generating (e.g. on-the-fly, while a call is in progress) a generic representation representing the caller. Some embodiments may retrieve a generic representation of the caller. For example, assuming a call comes in from phone number 201-308-0172, GRG unit 230 may retrieve, from repository 250, a generic representation 260 using 201-308-0172 as a search key. Some embodiments may provide the two generic representations (the one generated on-the-fly and the one retrieved from repository 250) to a VB engine which may be adapted to determine whether or not the two generic representations are of (e.g. related to, associated with) the same person. For example, a VB engine may compare a pair of inputs and, if a match is determined then the VB may indicate the caller is authenticated, a VB engine may indicate an attempted fraud if a match is not found.

In some embodiments, a generic representation may be generated based on at least one of: a bitrate of audio content and a sample rate of audio content. For example, the size of an array which may be, or may be included in, a generic representation 260 may be set according to a layerinfo value calculated as shown by formula A and described herein. Accordingly, a generic representation may be generated based on the bitrate and a sample rate of audio content (e.g., audio content stored in storage system 221 or audio content received as shown by arrow 285.

In some embodiments, a generic representation includes a byte array of features (e.g. an ordered array of bytes representing features) extracted from audio content. For example, features extracted (identified, determined and recorded, e.g., by feature extraction unit 420) may be amplitudes and frequencies of audio content as described. In some embodiments, the size of an array in a generic representation may be set based on at least one of: a bitrate of the audio content and a sample rate of the audio content. For example, in the example case above, the size of an array in a generic representation 260 may be set to 256 bytes based on the bitrate (16 kbits/sec) and sample rate (8,000 Mz).

In some embodiments, first and second generic representations of stored audio contents may be generated and provided to a VB unit. For example, in order to verify that two audio content data items (e.g., two recorded calls stored in storage system 221) are of (related to or including the voice of, or associated with) the same person, GRG unit 230 may generate generic representations of the stored recorded calls and provide the generate generic representations to VBE 240 which may in turn (using the generic representations) indicate whether or not the two recorded calls are of the same person. Any system or method may be used by VBE 240 in order to determine whether or not the two recorded calls are of the same person, for example, in a simplified example, VBE 240 may compare two byte arrays (e.g., two generic representations) and, if they are the same or similar, indicate the two byte arrays are related to the same person, in other cases, various thresholds or techniques may be used by VBE 240 in order to perform its task. It will be noted that embodiments of the invention may include any VB unit, including commercial or known VB units or systems.

In some embodiments, a reconstructed audio content may be generated based on a generic representation and the reconstructed audio may be provided to a VB unit. For example and as illustrated in FIG. 3C, GRG unit 230 may reconstruct output signal 320 (audio content) based on information in a generic representation 260 and GRG unit 230 may provide an output signal 320 to VBE 240. Some embodiments may be configured to reconstruct audio according to the input expected by a VB unit. For example, provided with configuration data that indicates the type, format or any other attributes of audio which VBE 240 supports (expects as input), GRG unit 230 may generate (reconstruct), based on a generic representation 260, audio content as expected by VBE 240. Accordingly, embodiments of the invention can be configured to work with any type of VB unit.

In some embodiments, a generic representation may be associated with a score value; and the generic representation may be provided to a VB unit if the score is within a predefined range. For example, when generating a generic representation 260, GRG unit 230 may associate the generic representation 260 with a score 270 as described. During authentication, GRG unit 230 may examine the score 270 and decide whether or not to provide the generic representation to VBE 240, e.g., if the score 270 is below a threshold value then GRG unit 230 may decide not to provide it to VBE 240 and, if the score is above a threshold value then GRG unit 230 may provide it to VBE 240. Accordingly, embodiments of the invention can guarantee a confidence level, that is, assure that generic representations 260 used for authentication or validation of callers meet a criteria.

In some embodiments, a score 270 is calculated using a loss function. For example, the loss function may be a function that measures (or quantifies) how much an output of an NN deviates from an expected output. For example, when training or generating a model 440 as described, the Euclidean distance between input and output may be used as a loss function and the score 270 may be, or it may be set according to, the distance. For example, the higher the distance, the lower may the score be, such that GRG unit 230 selects to use generic representations associated with a score 270 which is above a threshold value.

In some embodiments, if a score 270 is not within a predefined range then a unit (e.g., GRG unit 230) may use at least one of: input audio content and a generic representation to retrain the unit. For example, if during validation of a caller, GRG unit 230 determines that the score 270 of the relevant generic representation is below a threshold then GRG unit 230 may retrain itself (e.g., retrain a model 440 included in GRG unit 230). For example, GRG unit 230 may use the audio signal of the incoming call (e.g., provided to GRG unit 230 as shown by arrow 285) in order to retrain or improve its model, e.g., use the audio of the incoming call as input signal 310 as shown in FIGS. 3A and 3B and perform training as described with reference to FIGS. 3A and 3B.

In some embodiments, after retraining as described, GRG unit 230 may generate a new generic representation 260 and replace an existing (old, previous) generic representation 260 with the newly created generic representation 260. For example, having found a generic representation 260 with a score 270 that is below a threshold and provided with audio content to the relevant caller or person, GRG unit 230 may retrain itself and then generate a new (assumed better) generic representation 260. GRG unit 230 may compare the scores 270 of the old and new generic representations 260 and select to keep the one with the highest score 270. Accordingly, embodiments of the invention can continuously, automatically and autonomously improve themselves by continually training and improving scores 270 of generic representations 260.

In some embodiments, computer-implemented method of authenticating an identity may include training a neural network to generate generic representations of audio content; generating, using the neural network, a first generic representation representing audio produced by a person; receiving audio of a caller; generating, using the neural network, a second generic representation representing the audio of the caller; and providing the first and second generic representations to a voice biometric unit adapted to authenticate the caller based on the first and second generic representations. For example, an NN or CNN included in GRG unit 230 may be trained to generate generic representations 260 of audio content as described (e.g., with reference to FIG. 3A and/or FIG. 3B) and the NN (or a model of the NN) may be used to generate first and second generic representations, e.g., the first generic representation may represent a recorded call stored in storage system 221 and the second generic representation may represent an ongoing call with caller 206. The first and second generic representations may be provided to a VB unit, e.g., VBE 240 which may indicate the two generic representations are related to (of) the same person (e.g., meaning caller 206 is authenticated) or are related to (of) different people (meaning caller 206 is not authenticated or validated).

Figure 6:
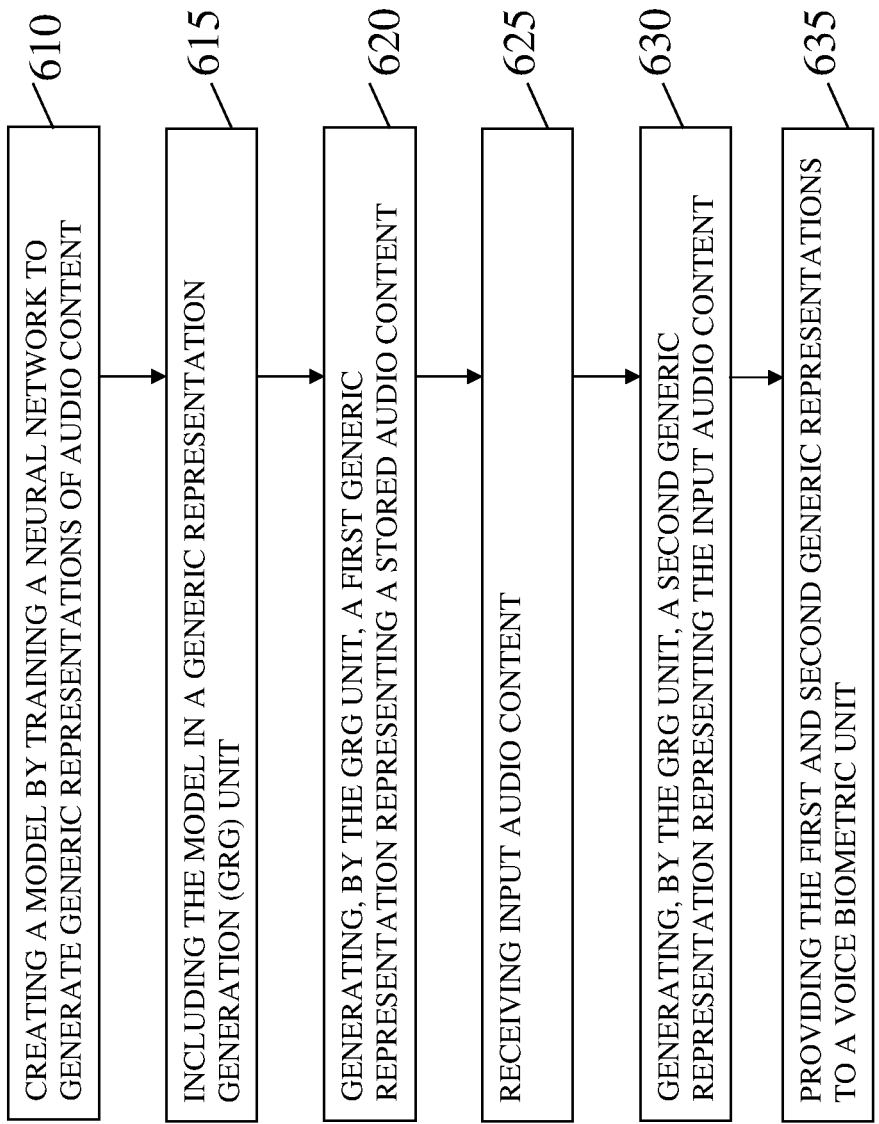
FIG. 6 shows a flowchart of a method according to illustrative embodiments of the present invention.

Reference is made to FIG. 6 which shows a flowchart of a method according to illustrative embodiments of the present invention. As shown by block 610, a model may be created by training a neural network to generate generic representations of audio content. For example, model 440 may be created as described.

As shown by block 615, the model may be included in a generic representation generation unit, for example, model 440 may be included in GRG unit 230.

As shown by block 620, a generic representation generation unit may generate a first generic representation representing a stored audio content. For example, GRG unit 230 may include a model 440 and may generate generic representations 260 based on recorded calls stored in storage system 221. As shown by block 625, input audio content may be received. For example, input audio content may be received during a call as shown by arrow 285 in FIG. 2.

As shown by block 630 a second generic representation representing the input audio content may be generated. For example, GRG unit 230 may generate a generic representation based on, using, or according to information in audio content received as shown by arrow 285 in FIG. 2.

As shown by block 635, the first and second generic representations may be provided to a VB unit (e.g., to VBE 240). For example, GRG unit 230 may provide two generic representations to VBE 240 which may be adapted to authenticate an identity associated with the input audio content. For example, GRG unit 230 may provide VBE 240 with a (first) generic representation 260 associated with caller 206 (e.g., retrieved from repository 250) and with a generic representation generated based on the audio received during a call, e.g., received as illustrated by arrow 285 in FIG. 2. VBE 240 may compare or match the two generic representations and indicate whether they are related to the same person (meaning caller 206 is validated or authenticated) or not (meaning caller 206 cannot by validated).

In the detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of generating a system for enrollment, the method comprising:
creating a model by training a neural network to generate generic representations of audio content, wherein the audio content is compressed via at least two different compression methods using different codecs, and wherein layer information for the neural network is calculated based on bitrate of the compressed audio content and the sample rate of the compressed audio content;
including the model in a generic representation generation (GRG) unit;
generating, by the GRG unit, at least a first generic representation representing a stored audio content;
receiving input audio content, wherein the input audio content is compressed;
generating, by the GRG unit, a second generic representation representing the input audio content, wherein the first and second generic representations are usable, by a voice biometrics (VB) unit, to authenticate an identity associated with the input audio content;
associating, by the GRG unit, the first generic representation with a score value: and
providing the first and second generic representations to the VB unit if the score is within a predefined range, wherein the score is calculated using a loss function, wherein the loss function is a function that measures how much an output of the neural network deviates from an expected output.

2. The method of claim 1, comprising providing the first and second generic representations to a second VB unit.

3. The method of claim 1, wherein the first generic representation is generated based on a bitrate of the stored audio content and a sample rate of the stored audio content.

4. The method of claim 1, wherein a generic representation includes a byte array of features extracted from audio content, and wherein the size of the byte array of features is set based on a bitrate of the stored audio content and a sample rate of the audio content.

5. The method of claim 1, comprising:
generating, by the GRG unit, a third generic representation of a second stored audio content; and
providing the second and third generic representations to the VB unit.

6. The method of claim 1, comprising generating a reconstructed audio content based on a generic representation and providing the reconstructed audio content to the VB unit.

7. The method of claim 1, comprising:
if the score is not within the predefined range then using at least one of: the input audio content and the second generic representation to retrain the GRG unit.

8. The method of claim 7, comprising:
after retraining the GRG unit, generating, by the retrained GRG unit, a new generic representation of the stored audio content; and
replacing the first generic representation by the newly created generic representation.

9. A system for enrollment, the system comprising:

a memory; and a generic representation generation (GRG) unit executed by a computer processor, the GRG unit including a model generated by training a neural network to generate generic representations of audio content, wherein the audio content is compressed via at least two different compression methods using different codecs, and wherein layer information of the neural network is calculated based on bitrate of the compressed audio content and the sample rate of the compressed audio content;

wherein the GRG unit is adapted to generate a first generic representation of audio stored in a storage system, receiving input audio content, wherein the input audio content is compressed;

the GRG unit also configured to:
- generate a second generic representation representing the input audio content, wherein the first and second generic representations are usable, by a voice biometrics (VB) unit, to authenticate an identity associated with the input audio content associate the first generic representation with a score value; and
- provide the first and second generic representations to the VB unit if the score is within a predefined range, wherein the score is calculated using a loss function, wherein the loss function is a function that measures how much an output of the neural network deviates from an expected output.

10. The system of claim 9, wherein a generic representation is generated based on at least one of: a bitrate of the stored audio content and a sample rate of the stored audio content.

11. The system of claim 9, wherein a generic representation includes a byte array of features extracted from the compressed audio content, and wherein the size of the byte array of features is set based on a bitrate of the compressed audio content and a sample rate of the compressed audio content.

12. The system of claim 9, wherein the GRG unit is further adapted to generate a reconstructed audio content based on a generic representation and provide the reconstructed audio content to the VB unit.

13. The system of claim 9, wherein the GRG unit is further adapted to: if the score is not within the predefined range then using at least one of: the input audio content and the second generic representation to retrain the GRG unit.

14. The system of claim 13, wherein the GRG unit is further adapted to:
- generate, after a retraining, a new generic representation of the stored audio content; and
- replace the first generic representation by the newly created generic representation.

* * * * *